United States Patent
Su et al.

(10) Patent No.: US 9,008,033 B2
(45) Date of Patent: Apr. 14, 2015

(54) APPARATUS AND METHODS FOR NETWORK ASSISTED HYBRID NETWORK OPERATION

(75) Inventors: Li Su, Cupertino, CA (US); Madhusudan Chaudhary, Cupertino, CA (US); Jianxiong Shi, Cupertino, CA (US); Longda Xing, San Jose, CA (US)

(73) Assignee: Apple Inc., Cupertino, CA (US)

( * ) Notice: Subject to any disclaimer, the term of this patent is extended or adjusted under 35 U.S.C. 154(b) by 293 days.

(21) Appl. No.: 13/475,802

(22) Filed: May 18, 2012

(65) Prior Publication Data

US 2012/0294291 A1    Nov. 22, 2012

Related U.S. Application Data

(60) Provisional application No. 61/488,620, filed on May 20, 2011, provisional application No. 61/598,815, filed on Feb. 14, 2012, provisional application No. 61/599,313, filed on Feb. 15, 2012.

(51) Int. Cl.
*H04W 72/04* (2009.01)
*H04W 72/10* (2009.01)
*H04W 72/12* (2009.01)

(52) U.S. Cl.
CPC ...... *H04W 72/1247* (2013.01); *H04W 72/1242* (2013.01); *H04W 72/12* (2013.01); *H04W 72/10* (2013.01); *H04W 72/1215* (2013.01)

(58) Field of Classification Search
None
See application file for complete search history.

(56) References Cited

U.S. PATENT DOCUMENTS

| | | | |
|---|---|---|---|
| 8,134,992 B1 * | 3/2012 | Nam et al. | 370/345 |
| 8,270,972 B2 * | 9/2012 | Otting et al. | 455/435.2 |
| 8,331,256 B2 * | 12/2012 | Lee et al. | 370/252 |
| 8,412,190 B1 * | 4/2013 | Moisanen et al. | 455/434 |
| 8,565,109 B1 * | 10/2013 | Poovendran et al. | 370/252 |
| 8,687,608 B2 * | 4/2014 | Soliman | 370/338 |
| 2002/0136184 A1 | 9/2002 | Liang et al. | |
| 2003/0181216 A1 | 9/2003 | Tsai et al. | |
| 2003/0214914 A1 * | 11/2003 | Cain | 370/252 |

(Continued)

FOREIGN PATENT DOCUMENTS

WO    2010121168 A1    10/2010
WO    WO2011046477    4/2011

(Continued)

OTHER PUBLICATIONS

Japanese Patent Application No. 2014-511606—Office Action dated Nov. 10, 2014.

*Primary Examiner* — Candal Elpenord
(74) *Attorney, Agent, or Firm* — Womble Carlyle Sandridge & Rice, LLP

(57) ABSTRACT

Methods and apparatus for minimizing scheduling collisions between networks. In one embodiment, the networks are substantially unsynchronized, and during hybrid network operation (e.g., LTE and CDMA 1× operation), a mobile device can place CDMA 1× voice calls while registered with the LTE network. However, since the LTE and CDMA 1× networks are not coordinated, the mobile device will experience scheduling collisions. In one variant, the LTE network accounts for predictable behaviors (such as CDMA 1× paging), and schedules low priority tasks during likely time interval conflicts. Consequently, even though the mobile device must tune away from the LTE network to check CDMA 1× pages, overall LTE network performance is minimally affected.

20 Claims, 5 Drawing Sheets

(56) References Cited

U.S. PATENT DOCUMENTS

| | | |
|---|---|---|
| 2009/0215472 A1 | 8/2009 | Hsu |
| 2010/0113010 A1* | 5/2010 | Tenny et al. ............... 455/423 |
| 2011/0007696 A1 | 1/2011 | Dayal et al. |
| 2011/0085498 A1* | 4/2011 | Oba et al. ................. 370/328 |
| 2011/0182221 A1* | 7/2011 | Arakawa .................. 370/311 |
| 2012/0034910 A1* | 2/2012 | Fang et al. ............... 455/422.1 |
| 2012/0231802 A1* | 9/2012 | Ngai ........................ 455/450 |

FOREIGN PATENT DOCUMENTS

| | | |
|---|---|---|
| WO | WO2011050195 | 4/2011 |
| WO | 2011056252 A1 | 5/2011 |
| WO | 2011056254 A1 | 5/2011 |

* cited by examiner

APPARATUS AND METHODS FOR NETWORK ASSISTED HYBRID NETWORK OPERATION

PRIORITY

This application claims priority to U.S. Provisional Patent Application Ser. Nos. 61/488,620 filed May 20, 2011 of the same title, 61/598,815 filed Feb. 14, 2012 of the same title, and 61/599,313 filed Feb. 15, 2012 of the same title, each of the forgoing being incorporated herein by reference in its entirety.

RELATED APPLICATIONS

This application is related to co-owned, U.S. Provisional Patent Application Ser. Nos. This application is related to co-owned, U.S. patent application Ser. Nos. 13/475,482 filed contemporaneously herewith on May 18, 2012 and entitled "APPARATUS AND METHODS FOR CLIENT SERVER INTERACTION IN HYBRID NETWORK ENVIRONMENTS", 13/475,802 filed contemporaneously herewith on May 18, 2012 and entitled "APPARATUS AND METHODS FOR OPTIMIZING SCHEDULED OPERATIONS IN HYBRID NETWORK ENVIRONMENTS," and co-owned, U.S. Provisional Patent Application Ser. Nos. 61/478,922 filed Apr. 25, 2011, and entitled "DUAL NETWORK MOBILE DEVICE RADIO RESOURCE MANAGEMENT", 13/099,204 filed May 2, 2011, and entitled "SINGLE-RADIO DEVICE SUPPORTING COEXISTENCE BETWEEN MULTIPLE RADIO ACCESS TECHNOLOGIES", 61/472,617 filed Apr. 6, 2011, and entitled "MULTIPLE NETWORK MOBILE DEVICE CONNECTION MANAGEMENT", 61/433,160 filed Jan. 14, 2011, and entitled "DYNAMIC LOADING IN DEVICES WITH MULTIPLE ANTENNAS", and 61/433,162 filed Jan. 14, 2011, and entitled "MULTIMODE USER EQUIPMENT WITH DUAL CIRCUIT ARCHITECTURE", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to operation within heterogeneous wireless systems such as, for example, hybrid network operation in which client devices can communicate using any one of several networks. More particularly, in one exemplary aspect, the present invention is directed to methods and apparatus for a network to minimize scheduling collisions with another network (e.g., one that is substantially unsynchronized with the first network).

2. Description of Related Technology

A cellular network operator provides mobile telecommunications services to the public via a network infrastructure of e.g., cellular base stations (BS), base station controllers, infrastructure nodes, etc. There is a wide variety of cellular network technologies, and historically cellular devices have been specialized for operation within a single cellular network. However, as cellular technologies have become increasingly commoditized, devices are now able to offer so-called "multimode" operation; i.e., a single device that is capable of operation on two or more cellular networks. Multimode operation allows a device to operate on any one of several network technologies, but does not enable operation on multiple network technologies simultaneously.

Incipient research is directed to so-called "hybrid" network operation. During hybrid network operation, the client device operates simultaneously among multiple distinct networks having different technologies. In one exemplary ease, a hybrid device can support both: (i) Long Term Evolution (LTE) and (ii) Code Division Multiple Access 1× (CDMA 1×) networks; i.e., the device can maintain a simultaneous connection between a first LTE network and a second CDMA 1× network. For example, a LTE/CDMA 1× hybrid device can conduct a voice call over the CDMA 1× network while the mobile device is in LTE mode. In another exemplary case, a hybrid device can support both: (i) CDMA 1×-EVDO (Evolution Data Optimized) and (ii) CDMA 1× networks.

Existing solutions for hybrid network operation rely on the client device to manage its own operation between networks. Specifically, the client device is responsible for maintaining its active connections to the various service networks; there are no required changes to existing network installations (i.e., hybrid network operation does not affect the legacy hardware and software of the network infrastructure). Client-centric hybrid operation has several benefits. For example, there is very little (if any) infrastructure cost for the network operator. Moreover, hardware costs can be incorporated into the price of consumer devices. Additionally, hybrid network operation will not affect existing legacy devices. Similarly, devices capable of hybrid operation are also capable of normal operation.

However, since existing solutions for hybrid network operation do not require the constituent networks to coordinate with one another, the client device will inevitably experience certain scheduling collisions. For example, while a mobile device is attached to a first LTE network, it must periodically "tune out" the LTE network to perform CDMA 1× actions (such as decoding the Quick Paging Channel (QPCH) to determine if the device is being paged). If the mobile device is receiving data from the LTE network during the tune out period, this data is lost. Furthermore, a tuned out mobile device will miss any broadcasted updated network resource information or control data, this can result in the mobile device being barred from access to the LTE network (at least for a period of time).

Consequently, improved methods and apparatus are needed to minimize scheduling collisions for mobile devices.

SUMMARY OF THE INVENTION

The present invention satisfies the aforementioned needs by providing, inter alia, improved apparatus and methods for minimizing scheduling collisions between networks.

In one aspect of the present invention, a wireless apparatus for minimizing collisions between networks is disclosed. In one embodiment, the wireless apparatus includes one or more network interfaces, a processor in data communication with the one or more network interfaces, and a storage device in data communication with the processor, the storage device comprising computer-executable instructions.

In one variant, the computer-executable instructions are configured to, when executed, identify a client device operative within the first network, determine one or more time slots during which the identified client device is likely to be scheduled for tasks of a first priority within a second network, and schedule a task having a second priority to be performed by the client device within the first network so as to occur during the determined one or more time slots.

In a second variant, the first priority is of a higher priority than the second priority.

In a third variant, the determination is based at least in part on information derived from an identifier received from the client device.

In a fourth variant, the determination is further based at least in part on timing information common to the first and second networks.

In a second aspect of the invention, a client device capable of hybrid network operation is disclosed. In one embodiment, the device includes a processor, at least two wireless interfaces in data communication with the processor, a storage device in data communication with the processor, the store device comprising computer-executable instructions.

In one variant, the computer-executable instructions are configured to, when executed, register to a first network using the a first wireless interface of the at least two wireless interfaces, determine a first schedule for receiving one or more communications from the first network based on a first identifier, register with a second network using a second wireless interface of the at least two wireless interfaces, provide the first identifier to the second network, and receive a second schedule determined by the second network based at least in part on the first identifier.

In a third aspect of the present invention, a method for minimizing collisions between networks is disclosed. In one embodiment, the method includes identifying a client device operative within a first network, determining one or more time intervals during which the identified client device may be scheduled high priority tasks within a second network, and scheduling a low priority task within the first network during the determined one or more time intervals.

In a fourth aspect of the invention, a computer-readable storage apparatus is disclosed. In one embodiment, the apparatus includes a storage medium having at least one computer program stored thereon, the at least one program being configured to, when executed, identify a client device, determine one or more time intervals during which the identified client device may be scheduled high priority tasks within another network, and/or schedule a low priority task during the determined one or more time intervals.

In a fifth aspect of the invention, a hybrid network system is disclosed. In one embodiment, the system comprises at least two networks, and at least one network of the hybrid network system prioritizes one or more of its tasks based on high priority tasks of one or more others of the at least two networks.

In a sixth aspect of the invention, a network is disclosed. In one embodiment, the network prioritizes one or more of its tasks based on designated tasks of one or more other networks.

Other features and advantages of the present invention will immediately be recognized by persons of ordinary skill in the art with reference to the attached drawings and detailed description of exemplary embodiments as given below.

Figure 1:
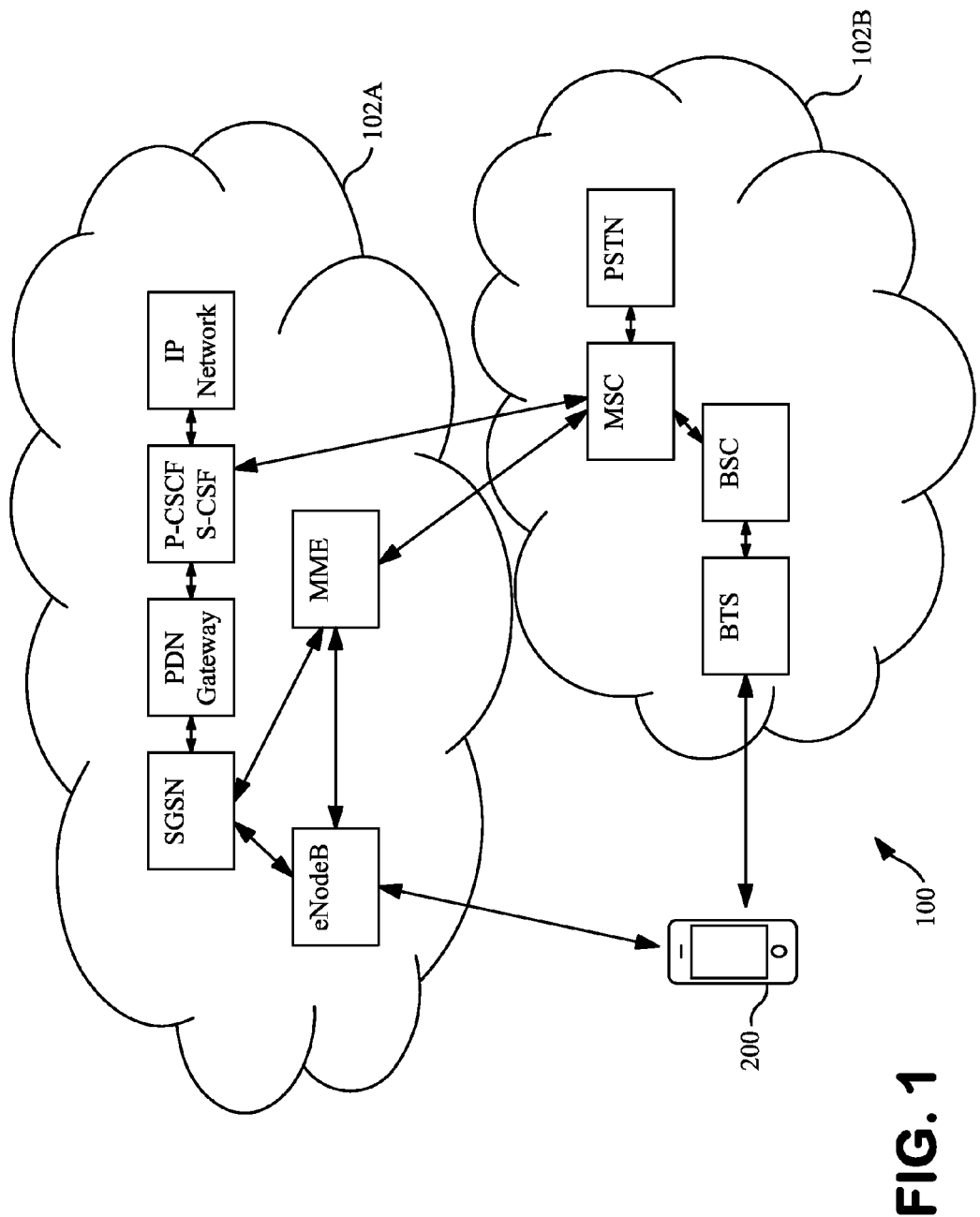
FIG. 1 is a logical block diagram illustrating one exemplary hybrid network system useful in conjunction with the present invention.

All Figures© Copyright 2011-2012 Apple Inc. All rights reserved.

DETAILED DESCRIPTION OF THE INVENTION

Reference is now made to the drawings, wherein like numerals refer to like parts throughout.

Overview

In one aspect, the present invention provides methods and apparatus for minimizing scheduling collisions between e.g., two or more unsynchronized networks. In one embodiment, a first network allocates certain time intervals for "low priority" tasks, based on the likelihood of a "high priority" task for another network occurring during these time intervals. Since only low priority tasks are scheduled for a client device during the allocated time intervals, performance is minimally affected when the client device tunes out of the first network to communicate with the other network(s). In one exemplary implementation, the first network is not notified when the client device tunes out to interact with another network. In fact, the first network may be entirely unaware of the client device's connection status to other networks, which advantageously simplifies operation, and obviates any infrastructure changes to the network(s).

The user equipment (UE) device can, e.g., tune out of a first network (e.g., an LTE network) in order to check paging channel messages of a second network (CDMA 1× network). The LTE network schedules radio monitoring tasks (e.g., a measurement gap) during CDMA 1× paging channel operation. Consequently, when the mobile device tunes to the CDMA 1× paging channel, there is no activity for the mobile device on the LTE network. After checking the paging channel, the mobile device can return to the LTE network, having only missed a low priority task. In the event of a received page, the mobile device may respond to the page, and let the LTE network connection time out.

Moreover, various aspects of the present invention can be applied to other networks, and other types predictable network traffic. More generally, various aspects of the present invention can be adapted to improved scheduling of tasks, to greatly reduce scheduling conflicts in multiple network environments.

DETAILED DESCRIPTION OF EXEMPLARY EMBODIMENTS

Exemplary embodiments and aspects of the present invention are now described in detail. While these embodiments and aspects are primarily discussed in the context of Long Term Evolution (LTE), Code Division Multiple Access 1× (CDMA 1×) cellular networks, and CDMA 1× EVDO (Evolution Data Optimized), it will be recognized by those of ordinary skill that the present invention is not so limited, and can be used with other cellular technologies such as TD-LTE (Time-Division Long-Term Evolution), TD-LTE-Advanced, TD-SCDMA (Time Division Synchronous Code Division Multiple Access) and Global System for Mobile Communications (GSM). In fact, the various aspects of the invention are useful in combination with any network (cellular, wireless, wireline, or otherwise) that can benefit from intelligent scheduling to minimize scheduling conflicts with other networks.

LTE/CDMA 1× Hybrid Network Operation—

FIG. 1 illustrates an exemplary hybrid network system 100. The exemplary hybrid network comprises a first LTE RAN (radio access network) 102A and a second CDMA 1×RAN 102B in communication with a user equipment (UE) client device 200. As shown in FIG. 1, the LTE RAN and CDMA 1×RAN are unsynchronized, and entirely unaware of the other RAN's operation. In other scenarios, the RANs may have higher levels of coordination; e.g., the RANs may be loosely synchronized, or even tightly synchronized in certain aspects of their operation.

Figure 2:
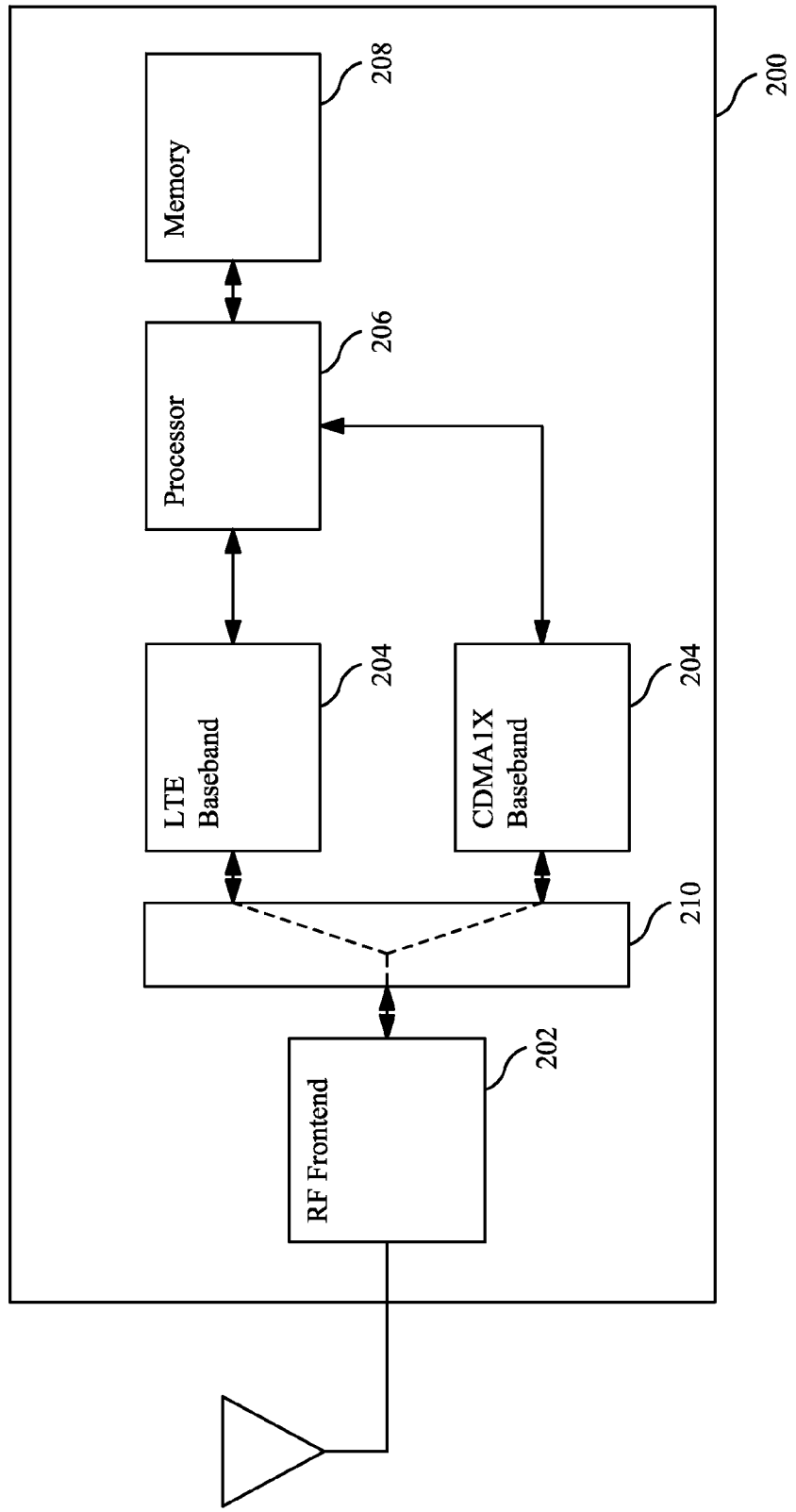
FIG. 2 is a functional block diagram of an exemplary embodiment of a user equipment (UE) apparatus configured according to the present invention.

Referring now to FIG. 2, the exemplary user equipment (UE) apparatus 200 is illustrated in greater detail. The UE includes: (i) one or more Radio Frequency (RF) front-ends 202, (ii) one or more baseband processors 204, and (iii) at least one application processor 206 and associated memor(ies) 208. In various implementations, the RF front-ends and baseband processors may be further specialized to handle a single wireless technology, or generalized to encompass multiple wireless technologies.

As shown, the exemplary UE includes a first RF front-end that is coupled to both first and second baseband processors adapted to interface to a LTE network and CDMA 1× network, respectively. It is further appreciated that the foregoing configuration is purely illustrative, and various implementations may include other cellular technologies such as GSM, GPRS, EDGE, WCDMA, CDMA2000, CDMA 1× EVDO, LTE-A (LTE Advanced), etc. in various combinations. Moreover, while only a single RF front-end is shown for simplicity, it is appreciated that a RF front-end can (and generally will) include multiple receive and/or transmit antennas and/or chains. For example, well known MIMO (Multiple In Multiple Out), SISO (Single In Single Out), MISO (Multiple In Single Out), and SIMO (Single In Multiple Out) antenna configurations are widely used within the related arts, and may be used consistent with the present invention.

Additionally, in one exemplary embodiment of the present invention, the UE 200 further comprises a switching fabric 210 that can connect any one (or more) of the baseband processors 204 to various one (or more) of the antennas 202. The illustrated switching fabric is adapted to connect either the LTE baseband or CDMA 1× baseband to the RF front-end. However, common embodiments may connect one baseband processor to one antenna ("one-to-one"), one-to-many, many-to-one, etc. This "switching" capability is desirable for a number of reasons, including for example: (i) power management, (ii) processing efficiency/flexibility, and (iii) antenna isolation constraints may require that only a subset of radios of a mobile device are active at any one time. In some small form factor designs, there is not enough space to completely isolate multiple antennas during operation; consequently, only one antenna can be active at any time. Similarly, certain form factor designs may reuse antennas for different wireless interfaces, such that only one wireless interface can use a common antenna at any given time. Yet other motivations will be appreciated by those of ordinary skill in the related arts, and are not discussed further herein (e.g., business or profit considerations, network utilization, etc.)

Moreover, it will be appreciated that other components are commonly incorporated within UE 200, but are not discussed further herein. For example, the UE may include user interface components (display screens, buttons, touch screens, dials, etc.), memory components (e.g., RAM (Random Access Memory), Flash, hard disk drives (HDD), etc.), power management components (e.g., batteries, charger components, etc.), and external interfaces (e.g., FireWire™, Universal Serial Bus™ (USB), Thunderbolt, etc.)

Furthermore, it should be recognized that the UE depicted in FIG. 2 is merely illustrative of one exemplary embodiment. Still other variants useful with the present invention are described with greater detail in co-owned and U.S. Provisional Patent Application Ser. Nos. 61/478,922 filed Apr. 25, 2011, and entitled "DUAL NETWORK MOBILE DEVICE RADIO RESOURCE MANAGEMENT", Ser. No. 13/099,204 filed May 2, 2011, and entitled "SINGLE-RADIO DEVICE SUPPORTING COEXISTENCE BETWEEN MULTIPLE RADIO ACCESS TECHNOLOGIES", 61/472,617 filed Apr. 6, 2011, and entitled "MULTIPLE NETWORK MOBILE DEVICE CONNECTION MANAGEMENT", 61/433,160 filed Jan. 14, 2011, and entitled "DYNAMIC LOADING IN DEVICES WITH MULTIPLE ANTENNAS", and 61/433,162 filed Jan. 14, 2011, and entitled "MULTI-MODE USER EQUIPMENT WITH DUAL CIRCUIT ARCHITECTURE", each of the foregoing being incorporated herein by reference in its entirety.

The exemplary UE 200 of FIG. 2 is capable of LTE/CDMA 1× hybrid mode operation within, e.g., the hybrid network system of FIG. 1. Specifically, the UE 200 can place CDMA 1× voice calls while registered with the LTE network. During hybrid operation, the UE can be registered to both a LTE network 102A and a CDMA 1× network 102B. The UE is capable of receiving and responding to data and control messaging from either the LTE network or the CDMA 1× network; however, as previously discussed, the UE cannot respond simultaneously to both networks, and always prioritizes CDMA 1× (voice call) traffic over LTE (data) traffic to ensure that user experience for voice calls is unaffected. Other implementations may have other prioritization schemes (e.g., where voice calls are lower priority, based on the type of traffic, historic device usage, etc.)

Specifically, once the UE 200 has connected to the LTE network 102A, the UE will periodically tune its radio away from the LTE network to perform CDMA 1× maintenance actions such as acquiring a CDMA 1× cell, registering to the acquired CDMA 1× cell, and receiving CDMA 1× pages, etc. Depending on CDMA 1× network 102B radio conditions, these actions can range in one exemplary implementation from eighty milliseconds (80 ms) up to several seconds (4 s-6 s). Moreover, when the UE receives or places a voice call on the CDMA 1× network, the LTE connection may be dropped.

Within this context, certain types of network maintenance are predictable, and can be scheduled around. Careful scheduling of LTE tasks can greatly reduce scheduling conflicts with CDMA 1× communications. For example, CDMA 1× has a very predictable paging mechanism. Since the UE must tune away from the LTE network to check CDMA 1× pages, the LTE network can predictively increase hybrid network performance by ensuring that CDMA 1× paging channel operation overlaps with low priority (or no priority) tasks.

TD-LTE/TD-SCDMA Network Operation—

As is understood in the art, Time-Division Long-Term Evolution (TD-LTE) also known as Long-Term Evolution Time-Division Duplex (LTE TDD) is similar to Frequency Division (FD)-LTE. In the case of Frequency Division Duplex, the downlink and uplink are transmitted using different frequencies. In Time Division Duplex, the downlink and the uplink are on the same frequency and the separation occurs in the time domain, so that each direction in a call is assigned to specific timeslots. Similarly, Time Division Synchronous Code Division Multiple Access (TD-SCDMA) allows traffic to be uplinked (from the mobile terminal to the base station) and downlinked (from the base station to the mobile terminal) using different time slots in the same frame. Embodiments of the present invention contemplate the use of these technologies together and separately (in combination with other technologies) in a hybrid network such as by implementing the methodology described herein with respect to FIG. 3 (except using one or more different combinations of radio access technologies set forth herein).

In an exemplary embodiment relating to both TD-LTE and TD-SCDMA, a UE connected to the TD-LTE network will periodically (or on an event driven or other basis) tune its radio away from the TD-LTE network to perform TD-SCDMA actions such as cell selection, registration, and receiving pages.

TD-LTE/GSM Network Operation—

As is understood in the art, Global System for Mobile Communications (GSM) is a cellular technology standard and has evolved a number of advancements including General Packet Radio Service (CPRS), Enhanced Data rates for GSM Evolution (EDGE), and Universal Mobile Telecommunications System (UMTS) also known as 3G (Third Generation) UMTS.

In an exemplary embodiment relating to both TD-LTE and GSM, a UE connected to the TD-LTE network will periodically (or on an event driven or other basis) tune its radio away from the TD-LTE network to perform GSM actions such as cell selection, registration, and receiving pages.

Methods—

Figure 3:
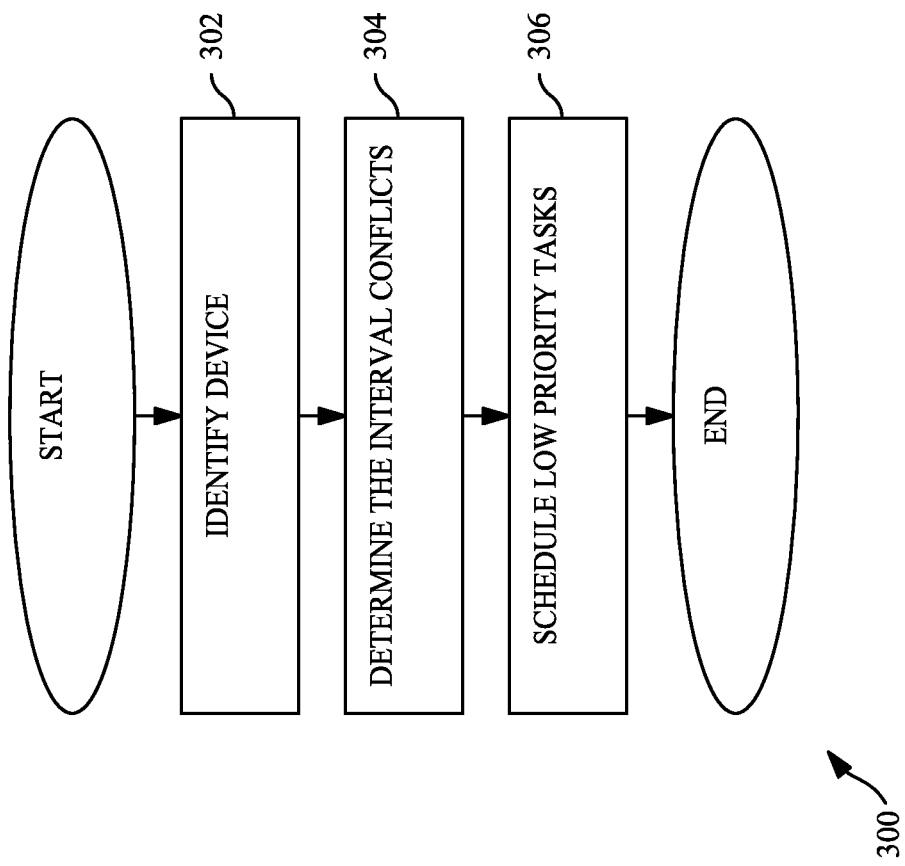
FIG. 3 is a logical flow diagram detailing one embodiment of a generalized method for minimizing scheduling collisions between unsynchronized networks, in accordance with the present invention.

Referring now to FIG. 3, one embodiment of a generalized method 300 for minimizing scheduling collisions with another unsynchronized network is illustrated. In one scenario, a client device is connected to a first network, where the first network is entirely unaware of the client device's connections to other networks. Alternatively, the first network may have limited information on nearby networks (e.g., timing information, registered devices, etc.) which may be periodically refreshed, but is not integrated within the operational decisions for the first network. Still other network scenarios may tightly integrate the first network and the other networks, but still require intelligent management of conflicting schedules to minimize collisions (e.g., where the networks share information such as location area updates, paging information, etc.). For example, even where a first LTE network is tightly coupled to a second CDMA 1× network, the LTE network must intelligently schedule its device accesses around the CDMA 1× network schedule, and vice versa.

At step 302 of the method 300, a client device is identified. In one embodiment, the client device is identified with an identifier which is unique across all networks. For example, in one exemplary embodiment, a mobile device is identified with an International Mobile Subscriber Identity (IMSI) which is unique for all mobile devices across all networks. In alternate embodiments, the client device is identified with an identifier which is unique for at least one network. For example, the device may be assigned a temporary identifier which may not be unique across all other networks, but which uniquely identifies the device for at least one network (e.g., common examples include e.g., network addresses, service set identifiers (SSIDs), etc.).

It will also be appreciated that while recited as an affirmative step, step 302 described above may in fact be integrated or performed intrinsically with other steps or operations For example, when the method 300 is implemented, a device (and in fact one or more of the relevant networks) may already know the identifier of the device, such as by virtue of authentication of the device to the network for access to services.

At step 304, a first network determines one or more time intervals during which the identified client device may be scheduled for "high priority" tasks within one or more other networks. As used herein, the term "high priority" is used to broadly include without limitation any number of different tasks, operations, or requirements associated with the operation of the device within the network, or with the network itself. The priority may be based on, e.g., tasks or operations: (i) necessary to keep the client device or UE in communication with the network, (ii) necessary to support temporally sensitive or periodic operations (e.g., to meet timing or QoS requirements for streaming media, emergency calls, important update broadcasts or beacons, etc.), and/or (iii) to support user-specified preferences or requirements (e.g., "Always prioritize X over Y" or the like).

Additionally, while a "high priority/low priority" (i.e., two-state) hierarchy of tasks is described with respect to the exemplary embodiments, it will be appreciated that any number of other schemes may be employed, such as a linear scale of priority (e.g., 1-10) with one or more thresholds for varying types of actions, an "always/never" scheme (e.g., where some actions or tasks are always prioritized, and others are never prioritized), etc.

Moreover, as used herein, the term "network" may include e.g., any managerial entity within the network which has been enabled to practice the various aspects of the present invention. For example, such entities may include base stations (e.g., NodeB, enhanced NodeB (eNB), etc.), Radio Network Controllers (RNC), etc.

In one exemplary embodiment, the first network and one or more other networks derive their time base from the same time reference. For example, while the LTE base stations and CDMA 1× base stations do not share the same time base and are not synchronized with one another, both networks derive their time base from the Global Positioning System (GPS) time reference. Accordingly, the LTE and CDMA 1× time bases will not drift in reference to one another. Therefore, CDMA 1× time can be calculated as a function of LTE time, and vice versa. Other examples of derived time references include those derived from power line alternating current (AC) frequencies (i.e., 60 Hz within the United States of America, 50 Hz elsewhere), or time references derived from a common signaling reference, etc.

Alternately, the first network and one or more other networks may be loosely synchronized. For example, while networks may not be constantly synchronized, they may exchange time information on a periodic/aperiodic basis (e.g., time stamps, time references, time pulses, etc.) to minimize time drift. Time reference adjustments are inherent to tightly coupled networks, and not discussed further.

Moreover, it is further recognized that alternate embodiments of the invention may determine one or more time intervals during which the identified client device may be scheduled to perform low priority tasks within one or more other networks. In these alternate embodiments, scheduled low priority tasks within other networks are ideal for scheduling high priority data transfers within the first network.

As described in greater detail hereinafter (see Example Operation), in one exemplary LTE/CDMA 1× hybrid environment, a mobile phone must check certain time slots of the Quick Paging Channel (QPCH), based on its International Mobile Subscriber Identity (IMSI). If the mobile phone has an incoming page on the QPCH, the mobile must additionally decode the Forward Common Control Channel (F-CCCH)/Forward Paging Channel (F-PCH) that immediately follows the QPCH. Accordingly, an LTE network eNodeB determines one or more of its own time intervals that overlap the estimated CDMA 1×QPCH time intervals (and subsequent F-CCCH/F-PCH decode) for the mobile device.

In addition to paging channel reception, it is further appreciated that various aspects of the present invention are usable with any predictable event (i.e., whenever it is of generally high likelihood that the identified device will be tuned away from the first network). Common examples of predictable events include periodic reception or transmission events (e.g., periodic broadcast channels, periodic updates, pilot channels, etc.), and deterministic events (e.g., receiving a location area update may be related to another network's updates, based on client device notification, etc.).

At step 306 of the method 300, the first network schedules low priority tasks for the identified client device during the determined time intervals. In one embodiment, the low priority tasks can be entirely preempted or ignored. Alternately, the low priority tasks can tolerate frequent interruption and/or failure.

Since in the exemplary embodiment, only low priority tasks are scheduled for the client device during the determined time intervals, performance is minimally affected by the client device tuning out to check other networks. In one implementation, the client device is not required to notify the first network when it is tuning out to interact with another network. Instead, the client device can tune out of the first network, perform its required actions within the other network(s), and return without interruption to the first network. For example, the client device can tune out of the LTE network, check the QPCH of the CDMA 1× network, and if there is no page, the device can return to normal LTE operation having only missed a low priority task. In the event of a received page, the mobile device may respond to the page, and let the LTE network connection eventually time out.

Alternately, in some embodiments, the mobile device may respond to the page, and notify the first network to allow the first network to terminate its connection "gracefully" (i.e., without abrupt loss of connectivity or service).

In some embodiments, low priority tasks do not involve an active data exchange between the client device and the first network. Alternatively, low priority tasks may include transfer of non-critical information, small amounts of data, redundant data, or may otherwise be configured to tolerate lossy behavior (e.g., robust forward error correction, re-transmission schemes, etc.). Common examples of low priority tasks include radio monitoring (e.g., cell selection/cell re-selection procedures), low priority messaging (e.g., location updates, periodic performance data, etc.), time insensitive data transmissions, etc.

Example Operation—

Figure 4:
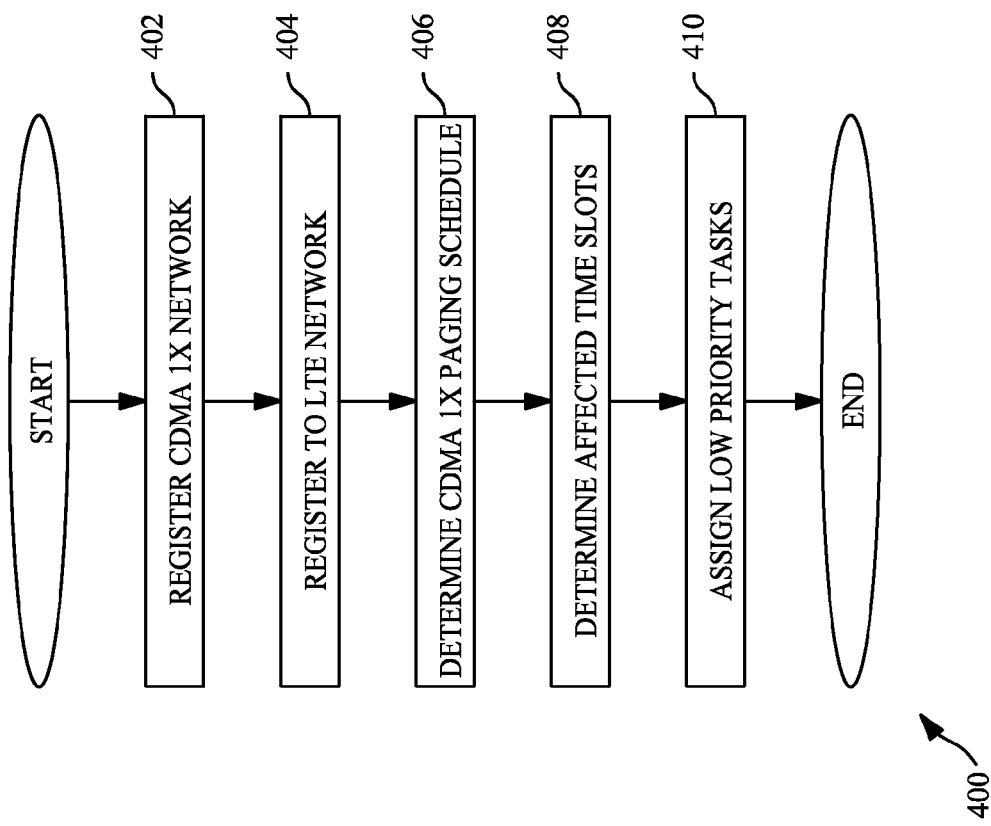
FIG. 4 is a logical flow diagram detailing one exemplary implementation of the method of FIG. 3 in the context of Long Term Evolution network and a Code Division Multiple Access 1× networks.

Referring now to FIG. 4, one exemplary implementation of the method 300 of FIG. 3 is shown and described, specifically in the context of minimizing scheduling collisions between a Long Term Evolution (LTE) network and Code Division Multiple Access 1× (CDMA 1×) network.

At step 402 of the method 400, the user equipment (UE) 200 registers with the CDMA 1× network 102B. During CDMA 1× registration, the UE identifies itself to the CDMA 1× network with its unique International Mobile Subscriber Identity (IMSI). Various aspects of CDMA 1× operation are defined by the UE's IMSI. For example, in CDMA 1× networks, mobile devices operate in so-called "slotted mode" paging operation. During slotted mode operation, a mobile device monitors the paging channel according to assigned slots (rather than checking every slot).

Within CDMA 1× networks 102B, the Quick Paging Channel (QPCH) is an un-coded, spread, and On-Off-Keying modulated spread spectrum signal. It is divided into eighty millisecond (80 ms) time slots. The UE 200 is assigned a QPCH slot that starts one hundred milliseconds (100 ms) before its assigned paging slot. The paging slot (PG_SLOT) is computed with a hashing function based on the UE's IMSI. The CDMA 1× hashing function ensures that paging for a population of mobile stations is evenly distributed across a number of paging resources.

The following hash function is specific to CDMA 1×, and other cellular technologies implement a wide range of different hash functions differently (and for other purposes). Hence, it will be appreciated that the following is provided merely for illustrative purposes, and the invention is in no way limited to this or any other particular hash or cryptographic functions.

CDMA 1× Hashing Function—

In CDMA 1× networks 102B, there are 2048 paging slots numbered from 0 to 2047 that span the maximum slot cycle length of 163.84 seconds. The hash function is deterministic and based on a hash key (HASH_KEY) which is derived from the mobile device or user equipment (UE) IMSI. The paging slot is determined according to the following equation:

$$\text{PG\_SLOT} = \text{FLOOR}[N \times (40503 \times (L \text{ XOR } H \text{ XOR DECORR})) \text{modulo } 2^{16} / 2^{16}],$$

where:
HASH_KEY=the 32 least significant bits of IMSI_O_S1+ $2^{24}$×IMSI_O_S2;
L=the 16 least significant bits of HASH_KEY;
H=the 16 most significant bits of HASH_KEY;
N=2048; and
DECORR=6× the twelve least significant bits of HASH_KEY.

Once the mobile device has determined an appropriate paging slot, the mobile device indicates (and regularly updates) a preferred slot cycle with the CDMA 1× network via e.g., registration messages, origination messages, and/or paging response messages. The combination of the mobile device's IMSI and negotiated parameters with the CDMA 1× network defines a paging scheme.

The mobile device will monitor pages via the forward paging channel (F-PCH) at the start of the slot in which a SLOT_NUM (which is based on system time) equals PG_SLOT (which is based on the mobile device's IMSI). The QPCH precedes the F-PCH by 100 ms, and can be used to determine if the mobile device should decode the F-PCH, or if the F-PCH can be ignored. The SLOT_NUM is given by the equation:

$$\text{SLOT\_NUM} = \text{FLOOR}[t/4] \text{modulo } 2048,$$

where:
t=system time (in frames).

Specifically, each mobile device can be paged with the F-PCH when the following equation is true:

$$(\text{FLOOR}[(t+5)/4] - \text{PG\_SLOT}) \text{modulo}(16 \times T) = 0,$$

where:
$T = 2^i$; and
where:
i=a SLOT_CYCLE_INDEX that is specified by the mobile device.

The mobile device monitors one bit of the QPCH per slot to determine whether it needs to look for an incoming page; if the bit is one (1), then the mobile device will decode the regularly assigned F-CCCH/F-PCH slot that immediately follows the QPCH. Otherwise, if the bit is zero (0), the mobile device can ignore the current paging cycle, and can return to sleep (or tune back to another network).

Referring back to FIG. 4, at step 404, the user equipment (UE) 200 registers to the LTE network 102A. The LTE network in this embodiment does not share any registration information with the CDMA 1× network 102B, and is unaware of the UE's registration status with the CDMA 1× network. However, the LTE network can determine both: (i) UE's paging schedule within the CDMA 1× network based on the UE's IMSI, and (ii) the CDMA 1× system time based on the a common GPS time reference. In fact, it is of note that the LTE network and the CDMA 1× network advantageously do not have to exchange any information with one another, and may not even be aware of one another, for operation of the present embodiment of the invention.

At step 406, the LTE network 102A determines the UE's 200 paging schedule within the CDMA 1× network 102B. In one embodiment, the LTE network calculates the UE's paging schedule based on the UE's IMSI (see CDMA 1× Hashing Function, supra). The UE's paging schedule is the same regardless of the CDMA 1× network with which it is registered.

Moreover, it is appreciated that paging schemes for other network technologies are also relatively simple to describe, thus a mobile device's paging schedule can be easily determined with relatively little information for other network technologies (e.g., by querying the device itself, its attached network, etc.).

At step 408 of the method 400, the LTE network 102A determines one or more affected time slots, based on the UE's 200 paging schedule. The LTE network converts the CDMA 1× time slots to corresponding LTE time slots based on a transform. Since both LTE networks 102A and CDMA 1× networks 102B derive their time references from the same Global Positioning System (GPS) time reference, the CDMA 1× and LTE time references will not drift with respect to one another.

At step 410, the LTE network 102A schedules one or more low priority tasks for the UE during the determined time periods. Since only low priority tasks overlap any possible CDMA 1× network maintenance, the LTE network will be minimally affected (if at all) when the UE 200 tunes away from the LTE network. In this example, the LTE network configures a measurement gap for the UE to measure inter-frequency or inter-RAT (Radio Access Technology) cell quality. Even though measurement gap is allocated to the UE for inter frequency and inter-RAT cell detection and measurement, the UE can use this time to tune out and monitor the CDMA 1× paging indicators in the CDMA Quick Paging Channel (QPCH).

Apparatus—

Figure 5:
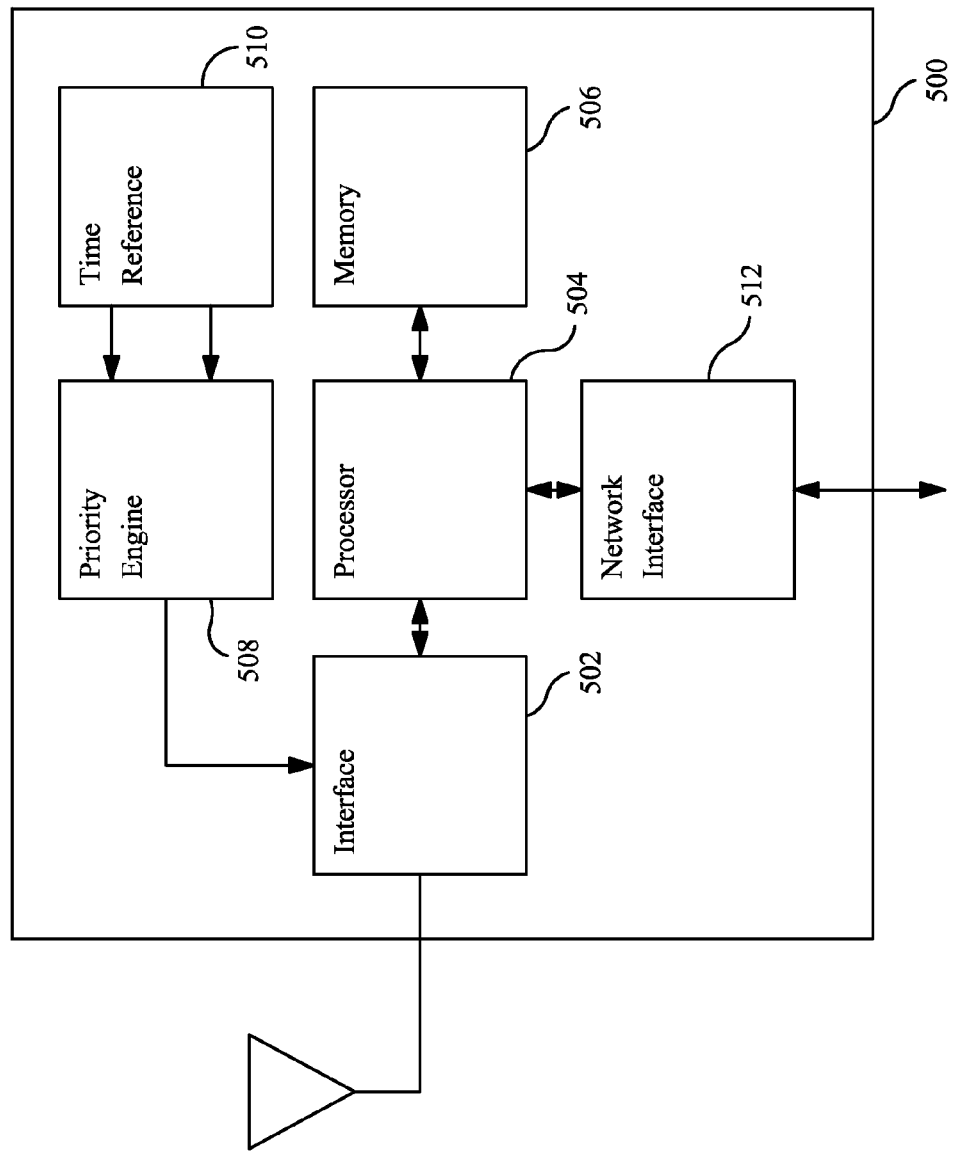
FIG. 5 is a functional block diagram of an exemplary embodiment of a wireless network apparatus useful for implementing various of the methods of the present invention.

FIG. 5 illustrates one exemplary embodiment of a network entity 500 configured in accordance with the present invention. The network entity may be a stand-alone entity, or be incorporated with other network entities (e.g., a base station, a base station controller, a radio access network controller, etc.).

As shown in FIG. 5, the network entity 500 generally includes a wireless (e.g., cellular) interface 502 for interfacing with cellular devices, a processor 504, and a storage apparatus 506. The cellular interface is shown as a wireless cellular interface configured for communication with one or more mobile devices, although other configurations and functionalities may be substituted. For example, in alternate embodiments, the cellular interface may be a wireline communication to a base station, where the base station is in communication with the mobile device.

The cellular interface 502 of the apparatus 500 shown in FIG. 5 at a high level includes one or more radio transceiver circuits configured to transmit and receive data via radio frequency transmissions (RF). Common embodiments of a radio transceiver generally include a modem processor, and one or more antennas. In one exemplary embodiment of the present invention, the radio transceiver is configured in accordance with Long Term Evolution (LTE) radio access technologies. It is recognized that various other implementations of the present invention may be configured for other cellular and/or wireless standards. Common examples of such technologies include: GSM, GPRS, EDGE, WCDMA, CDMA2000, CDMA 1×, CDMA 1×-EVDO, LTE-A, etc. and various combinations thereof.

In one exemplary embodiment, the cellular interface 502 is connected to a priority engine 508, where the priority engine is configured to prioritize one or more network resources according to a likelihood of collision with other network resources. In one exemplary embodiment, the priority engine comprises a computer program which receives a time reference for one or more other networks, and schedule information for the one or more other networks.

In one variant, the time reference information is derived from a Global Positioning System (GPS) receiver master time reference 510. In alternate variants, other time references may be received over a network interface, dedicated interface, internal reference, etc. Furthermore, the network apparatus may be adapted to generate and track one or more additional time references associated with one or more other network time domains. For example, as shown, the network entity can generate both an LTE network time reference and a CDMA 1× network time reference. Other various embodiments may provide localized time reference generation which can be periodically adjusted based on adjustment data (e.g., for example, time stamps exchanged between loosely coupled networks). In other such exemplary implementations, the time reference may be externally provided to the network entity; e.g., where the network entity is connected to other network entities that have a known time reference.

In one variant, the schedule information may be based on known operation of the one or more other networks, or alternately, may be identified to the priority engine 508 via explicit messaging. For example, a peer network entity of one or more other networks may provide the priority engine with e.g., a known paging schedule. In other variants, the schedule information may be known a priori by the priority engine. For example, the priority engine may have been manufactured with scheduling information associated with the one or more other networks, or be updated with such information by e.g., a manufacturing authority, or other supervisory entity. Such updates may be received through the wireless interface(s), or via other interfaces (including e.g., wireline).

During normal operation, the aforementioned cellular interface 502 adjusts communication capabilities with mobile devices, based at least in part on the priority engine 508 input. For example, in one exemplary embodiment, the cellular interface is configured to provide measurement intervals for a mobile device, in low priority time slots associated with that mobile device. In other examples, the cellular interface may be configured to only transmit low data rate, robust data during low priority time slots; or alternately, only control information which can tolerate high loss rates. Still other variations of the present invention are readily recognized by those of ordinary skill in the related arts, given the contents of the present disclosure.

The processor 504 includes one or more processors (or multi-core processor(s)). Additionally, the processor is coupled to processing memory and/or the storage apparatus. Common implementations of the processing subsystem are implemented within signal processors, general processors, network processors, field programmable gate arrays (FPGAs), digital signal processors (DSPs), and any combination of the foregoing. Typical implementations of memory and storage apparatus include Random Access Memory (RAM) and variations thereof (Dynamic RAM, Static RAM, Synchronous RAM, etc.), Flash memory, and Hard Disk Drives (HDD). Moreover, it is further appreciated that one or more memory apparatus may further be configured in various redundancy schemes (e.g., Redundant Arrays of Inexpensive Drives (RAID)), etc.

In one exemplary embodiment, the network entity 500 is further coupled to a wired network infrastructure via a network interface 512. The network interface is generally adapted for use with Ethernet networks, although other suitable network variations include Synchronous Optical Networking (SONET), Asynchronous Transfer Mode (ATM), MoCA, etc. Various forms of physical interface are widely used within the related arts, including for example Ethernet cable (e.g., CAT5), coaxial, fiber optics, etc.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A network apparatus that is associated with a first wireless network and is configured to prioritize tasks to be performed by a client device when the client device is connected to the first wireless network and a second wireless network, the network apparatus comprising:
   one or more network interfaces configured to communicate with the client device via the first wireless network;
   one or more processors coupled to the one or more network interfaces; and
   a storage device coupled to the one or more processors, and storing computer-executable instructions that, when executed by the one or more processors, cause the network apparatus to:
   identify the client device when the client device is connected to the first wireless network;
   determine one or more time resources during which the client device will be scheduled to perform one or more high priority tasks via the second wireless network when the client device is connected to the first wireless network; and
   schedule one or more low priority tasks to be performed by the client device via the first wireless network during the determined one or more time resources, wherein the client device is scheduled to perform at least one of the one or more low priority tasks via the first wireless network at the same time the client device will be scheduled to perform at least one of the one or more high priority tasks via the second wireless network.

2. The network apparatus of claim 1, wherein the one or more high priority tasks are associated with monitoring a paging channel of the second wireless network for one or more paging communications.

3. The network apparatus of claim 1, wherein the network apparatus determines the one or more time resources based at least in part on information derived from an identifier received from the client device.

4. The network apparatus of claim 3, wherein the network apparatus determines the one or more time resources further based at least in part on time slot scheduling information that is common to the first wireless network and the second wireless network.

5. The network apparatus of claim 1, wherein the network apparatus determines the one or more time resources at the network apparatus via the first wireless network, without direct coordination with the second wireless network.

6. The network apparatus of claim 1, wherein the first wireless network comprises a radio access technology (RAT) that is different from a RAT of the second wireless network.

7. The network apparatus of claim 1, wherein the execution of the computer-executable instructions by the one or more processors further causes the network apparatus to:
   evaluate the determined one or more time resources with respect to the scheduled one or more low priority tasks; and
   coordinate the scheduled one or more low priority tasks with the determined one or more time resources, such that at least one of the one or more high priority tasks occurs at the same time as the one or more low priority tasks.

8. The network apparatus of claim 1, wherein the first wireless network is a Long Term Evolution (LTE) network, and the second wireless network is a Code Division Multiple Access (CDMA) network or a Global System for Mobile Communications (GSM) network.

9. A client device configured for hybrid network operation, the client device comprising:
   one or more processors;
   one or more wireless interfaces configurable to communicate via at least a first wireless network and a second wireless network; and
   a storage device coupled to the one or more processors, storing computer-executable instructions that, when executed by the one or more processors, cause the client device to:
   register with the second wireless network using a second wireless interface of the one or more wireless interfaces;
   determine a schedule for receiving one or more high priority communications via the second wireless network based at least in part on a device identifier;
   register with the first wireless network using a first wireless interface of the one or more wireless interfaces; and receive a schedule determined by the first wireless network for performing one or more low priority communications via the first wireless network based at least in part on the device identifier,
wherein the client device is scheduled to perform at least one of the one or more low priority communications via the first wireless network at the same time the client device is scheduled to receive the one or more high priority communications via the second wireless network.

10. The client device of claim 9, wherein the device identifier is an international mobile subscriber identifier (IMSI) associated with the client device.

11. The client device of claim 9, wherein the first wireless network is a Long Term Evolution (LTE) network, and the second wireless network is a Code Division Multiple Access (CDMA) network or a Global System for Mobile Communications (GSM) network.

12. The client device of claim 9, wherein the schedule for receiving the one or more high priority communications via the second wireless network is a paging schedule for the client device to monitor a paging channel of the second wireless network for one or more paging communications.

13. The client device of claim 12, wherein the schedule determined by the first wireless network for performing one or more low priority communications via the first wireless network is utilized by the client device to allow the client device to maintain communication with the first wireless network when the client device receives the one or more high priority communications via the second wireless network.

14. A method for prioritizing tasks to be performed by a client device when the client device is connected to a first wireless network and a second wireless network, the method comprising:
at a network apparatus including one or more network interfaces that are configured to communicate with the client device via the first wireless network:
identifying the client device when the client device is connected to the first wireless network;
determining one or more time resources during which the client device will be scheduled to perform one or more high priority tasks via the second wireless network when the client device is connected to first wireless network; and
scheduling one or more low priority tasks to be performed by the client device via the first wireless network during the determined one or more time resources, wherein the client device is scheduled to perform at least one of the one or more low priority tasks via the first wireless network at the same time the client device will be scheduled to perform at least one of the one or more high priority tasks via the second wireless network.

15. The method of claim 14, wherein the first wireless network and the second wireless network are substantially unsynchronized with each other.

16. The method of claim 14, wherein determining the one or more time resources is based at least in part on information derived from an identifier associated with the client device.

17. The method of claim 16, wherein determining the one or more time resources is further based at least in part on a time reference that is common between the first wireless network and the second wireless network.

18. The method of claim 14, wherein the first wireless network and the second wireless network are cellular telecommunication networks.

19. The method of claim 18, wherein the first wireless network comprises a different radio access technology (RAT) than a RAT of the second wireless network.

20. The method of claim 14, wherein the first wireless network is a Long Term Evolution (LTE) network, and the second wireless network is a Code Division Multiple Access (CDMA) network or a Global System for Mobile Communications (GSM) network.

* * * * *